April 23, 1935.   J. JÄDERLUND   1,999,100
LUBRICATING DEVICE FOR INTERNAL COMBUSTION MOTORS
Filed Jan. 10, 1933
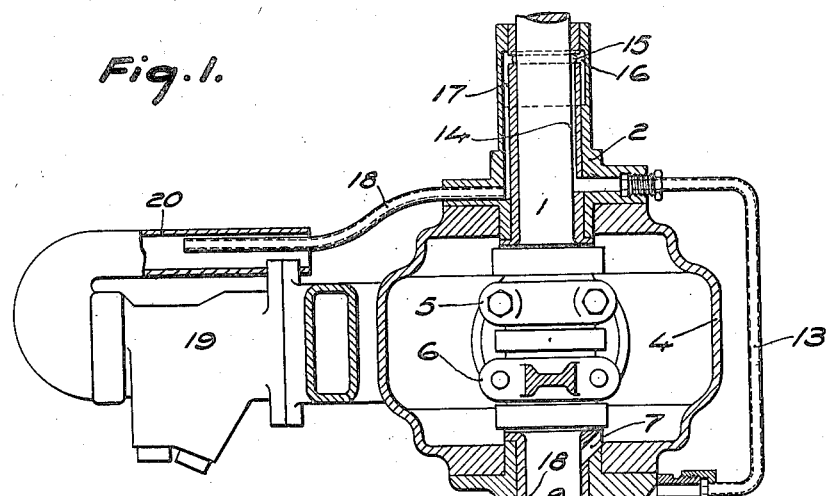
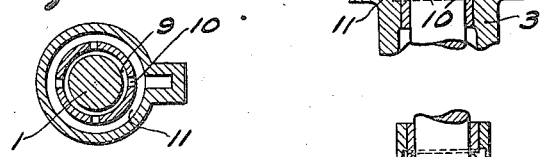
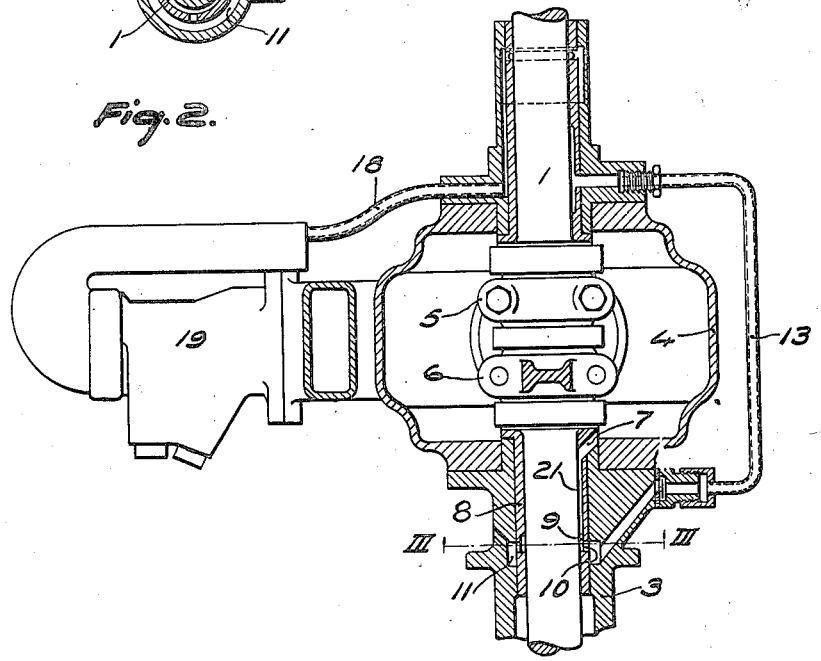
J. Jäderlund
INVENTOR
By Marks & Clerk
Attys.

Patented Apr. 23, 1935

1,999,100

UNITED STATES PATENT OFFICE 1,999,100

LUBRICATING DEVICE FOR INTERNAL COMBUSTION MOTORS

Johan Jäderlund, Stockholm, Sweden

Application January 10, 1933, Serial No. 651,041
In Sweden June 30, 1931

1 Claim. (Cl. 184—6)

This invention relates to an oil circulation device for the upper and lower crank-shaft bearings in internal combustion motors with vertical shaft and closed crank-case in order to make it possible to obtain a uniform and plentiful lubrication both of the upper and of the lower crank-shaft bearing.

The invention consists substantially therein that a canal system or receptacle for taking up the lubricating oil, which has passed part of the bearing, is provided at the shaft of the lower bearing, the said receptacle communicating with the upper bearing by means of a closed conduit, so that by the variations in pressure in the crank-case of the motor the oil, which has been taken up, is supplied to the upper bearing and from the upper bearing through a closed conduit again to the crank-case or to the suction pipes of the carburettor or of the motor.

In the accompanying drawing Figure 1 shows an embodiment of the invention, in which the receptacle is provided on the lower part of the bearing. A closed conduit extends from the receptacle to the upper bearing, and by means of grooves in the bearing and a conduit connected to the upper bearing the said conduit is in direct communication with the suction pipe of the carburettor.

Figure 2 shows another embodiment of the invention and

Figure 3 is a cross section of the lower bearing at the receptacle 11.

In Figure 1 the crank-shaft is indicated by numeral 1, the numeral 2 indicates the upper crank-shaft bearing, 3 the lower crank-shaft bearing, 4 the crank-case and 5 and 6 the piston rods. A canal 7 extends from the crank case to the lower bearing, so that all oil which is taken up in the crank-case, flows down, to the lower bearing. An annular groove 9 is provided at the inside of the bushing 8, said groove communicating with a receptacle 11 by means of one or more openings 10. If desired, the receptacle 11 may be brought into contact with the atmosphere by means of an opening 12. A closed conduit 13 leads from the receptacle 11 to the upper crank-shaft bearing, which conduit communicates with the suction pipes 20 of the carburettor 19 or of the motor or with the crank-case 4 by means of a groove 14 extending in the longitudinal direction of the bearing, by the annular groove 15, the openings 16, the canal 17 and the conduit 18.

At the suction stroke of the motor a strong sucking action is effected in the mouth of the conduit 18 and the vacuum arising thereby in the conduit being transmitted to the receptacle 11 through the canals and the grooves of the upper bearing and through the closed conduit 13, the oil accumulated in the receptacle is sucked through the conduits to the upper bearing and from the upper bearing through the carburettor back again to the crank-case of the motor. The oil in the groove 14 of the upper bearing comes into direct contact with the crank-shaft so that the same will be plentifully lubricated.

The arrangement according to Figure 1 prevents the oil from forcing its way out through the bearings along the crank-shaft, at the same time as the arrangement automatically attends to an effective lubricating of the upper as well as the lower crank-shaft bearing.

In the embodiment according to Figure 2 the crank-case communicates with the annular groove 9 by means of the canal 7 and a groove 21 of the bearing, and also with the receptacle 11 by means of the openings 10, so that the oil accumulated in the receptacle is pressed up to the upper crank-shaft bearing through the conduit 13 on account of the crank-case pressure. In this embodiment it is suitable to provide a valve in the conduit 13, which prevents the oil from being sucked back.

The invention is not limited to the embodiments above mentioned.

Having now described my invention, what I claim as new and desire to secure by Letters Patent is:

An oil circulating device for internal combustion engines including in combination an oil containing crank casing, upper and lower bearings in the crank casing, a vertical shaft journaled in the bearings, an oil receptacle disposed in each of said bearings in such manner that oil is in direct contact with the shaft, the receptacle in the lower bearing being in communication with the crank casing, a pressure source having a value different from atmospheric pressure, a conduit connecting the lower portions of the receptacles together, another conduit connected with the upper bearing and with the pressure source, said conduits and pressure source cooperating with the bearings in the casing to induce a circulation of the oil.

JOHAN JÄDERLUND.